United States Patent

[11] 3,607,202

[72] Inventor Francis L. Swillinger
Perrysburg, Ohio
[21] Appl. No. 708,542
[22] Filed Feb. 27, 1968
[45] Patented Sept. 21, 1971
[73] Assignee Libbey-Owens-Ford Glass Company
Toledo, Ohio

[54] FLOAT GLASS PLENUM CHAMBER CLOSURES
6 Claims, 7 Drawing Figs.
[52] U.S. Cl. .................................................. 65/182 R,
65/374
[51] Int. Cl. ...................................................... C03b 18/00
[50] Field of Search .......................................... 65/182, 99,
32, 157, 374; 263/3; 49/488

[56] References Cited
UNITED STATES PATENTS
1,728,453  9/1929  Stanton ........................ 49/488 X
3,443,922  5/1969  Settino ......................... 65/182 X Primary Examiner—S. Leon Bashore
Assistant Examiner—J. B. Hardaway
Attorney—Collins and Oberlin ABSTRACT: This application discloses a plenum chamber for enclosing the atmosphere above the float bath in a float glass forming apparatus, with a closure drape at its exit end that is made up of a doubled or looped sheet of asbestos supported from its free ends to hang with its loop end adjacent the glass ribbon moving over the float bath, a metal rod hung inside and acting to maintain the looped sheet in a generally vertical plane, and a looped sheet of a different refractory material hung adjacent and similar to the asbestos sheet but enough longer to permit its loop end to lie on the moving ribbon of glass and to be carried thereby beneath the metal rod.

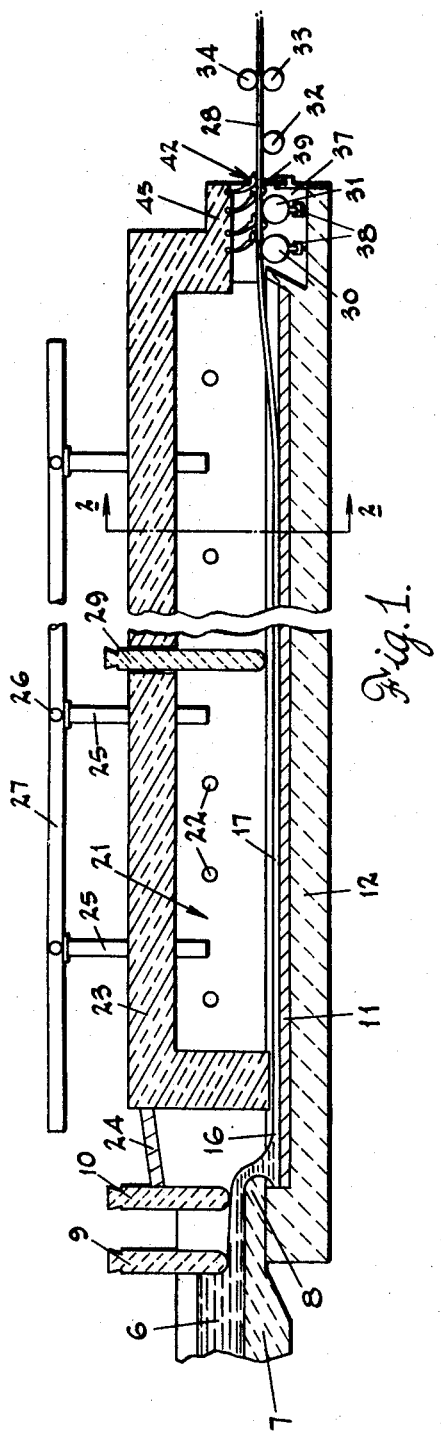
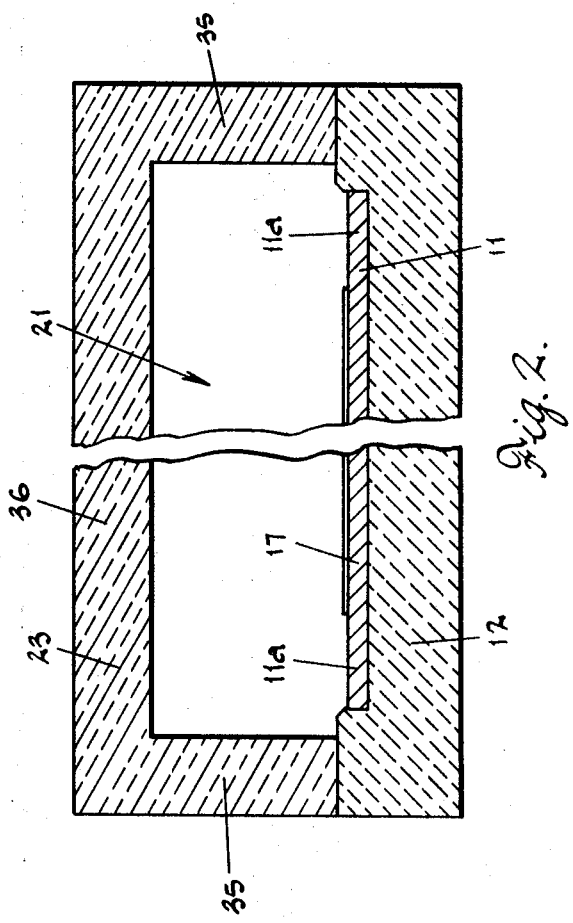

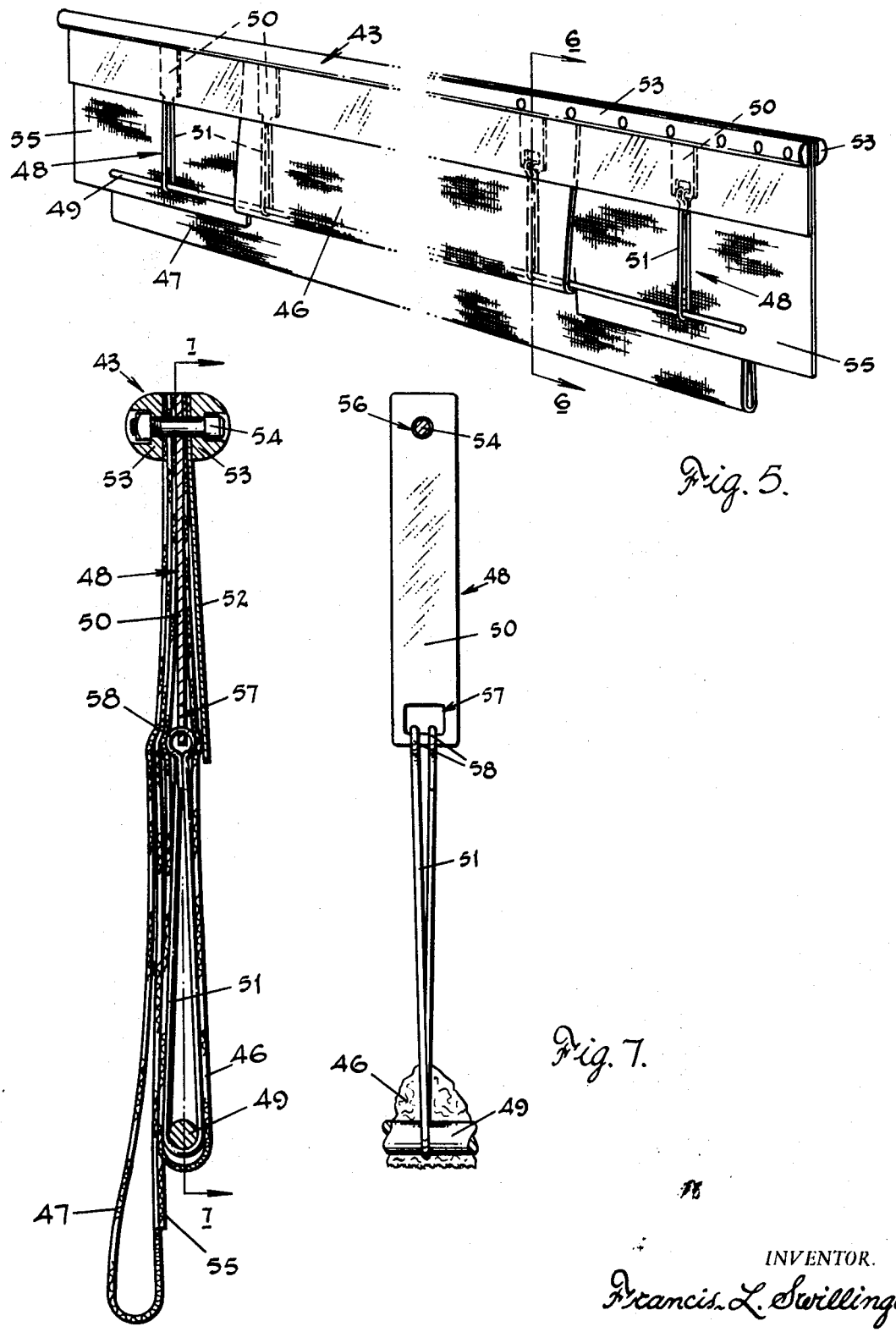

3,607,202

FLOAT GLASS PLENUM CHAMBER CLOSURES

BACKGROUND OF THE INVENTION

1. Field of the Invention

The present invention relates broadly to the manufacture of float glass. More particularly it has to be with improvements in the plenum chamber which confines the atmosphere above the float bath, and includes a special type of draped baffle or closure for said chamber.

2. Description of the Prior Art

A conventional form of float glass forming apparatus is illustrated and described in U.S. Pat. No. 3,083,551, granted Apr. 2, 1963, and, as there explained, the manufacture of flat glass by the float process involves delivering glass at a controlled rate onto a bath of molten metal (such as tin) and advancing it along the surface of the bath under physical and thermal conditions which assure (1) that a layer of molten glass will be established on the bath, (2) that the glass in the layer can flow laterally unhindered to develop on the surface of the bath a buoyant body of molten glass of stable thickness, and (3) that the buoyant body in ribbon form will be continuously advanced along the bath and sufficiently cooled as it advances to permit it to be taken unharmed off the end of the bath by mechanical conveying means.

Above the float bath of molten metal an enclosed headspace or plenum chamber is provided to contain the so-called float atmosphere, which is usually a nonoxidizing gas or mixture of gases maintained under pressure to inhibit contamination by outside air leaking into the headspace.

In actual commercial practice infiltration of air into the headspace has been found to create serious problems because the air contains elements such as oxygen which chemically react with the metal in the float bath to produce contaminants for the glass in the ribbon floating on the bath. Indeed the degree to which outside air can be excluded from the headspace over the bath is quite largely determinative of the quality of the ultimate float glass product produced; and, because the importance of preventing air leakage into the headspace has been appreciated by workers in this art, many steps have already been taken to make the plenum chamber itself as tight as possible.

However, certain areas, and notably the area at the end of the chamber where the float glass ribbon is being continuously removed from the float bath, have resisted prior efforts to effectively seal them. Thus, the use of movable end walls such as shown at 18 in FIG. 1 of U.S. Pat. No. 3,083,551, have never been satisfactory; and even with the most sophisticated forms of plenum chamber end closures heretofore suggested it has not been possible to consistently maintain the desired pressures in the chamber.

SUMMARY

According to the present invention the problems resulting from excessive air leakage into the discharge end of the plenum chamber are effectively overcome by the provision of a special form of what will be hereinafter referred to as an exit end drape in and forming a part of the chamber. This special drape is so constructed and mounted that it hangs vertically and is effectively retained in that general plane, to close the plenum chamber exit, while at the same time an extending portion rides directly on and drags over the surface of the glass ribbon to provide an effective seal therewith.

Therefore, it is a primary object of the invention to provide an effective end closure or seal for the plenum chamber.

Another object is to provide a novel form of heat-resistant drape for use in the plenum chambers of float glass apparatus that is of doubled or looped, multilayer construction, equipped with an internal position-retaining member, and having an extending portion that cooperates with the moving float glass ribbon to effectively baffle air movement above and at either side of the ribbon.

Further objects and advantages of the invention will become apparent in the course of the following description, when taken in connection with the accompanying drawings.

BRIEF DESCRIPTION OF THE DRAWINGS

In the drawings, wherein like numerals are employed to designate like parts throughout:

FIG. 1 is a longitudinal, vertical sectional view through a conventional type of float glass forming apparatus but illustrating a plenum chamber equipped with closure drapes in accordance with the invention;

FIG. 2 is a transverse, vertical sectional view taken substantially along the line 2—2 in FIG. 1;

FIG. 5 is a perspective view of a preferred form of the closure drape of the invention;

FIG. 6 is an enlarged vertical sectional view of the closure drape of FIG. 5, taken substantially along the line 5—5 in that figure; and FIG. 7 is a fragmentary, elevational view of the internal positioning member of the closure drape of FIG. 5, taken substantially along the line 7—7 of FIG. 6.

DESCRIPTION OF THE PREFERRED EMBODIMENTS

Figure 3:
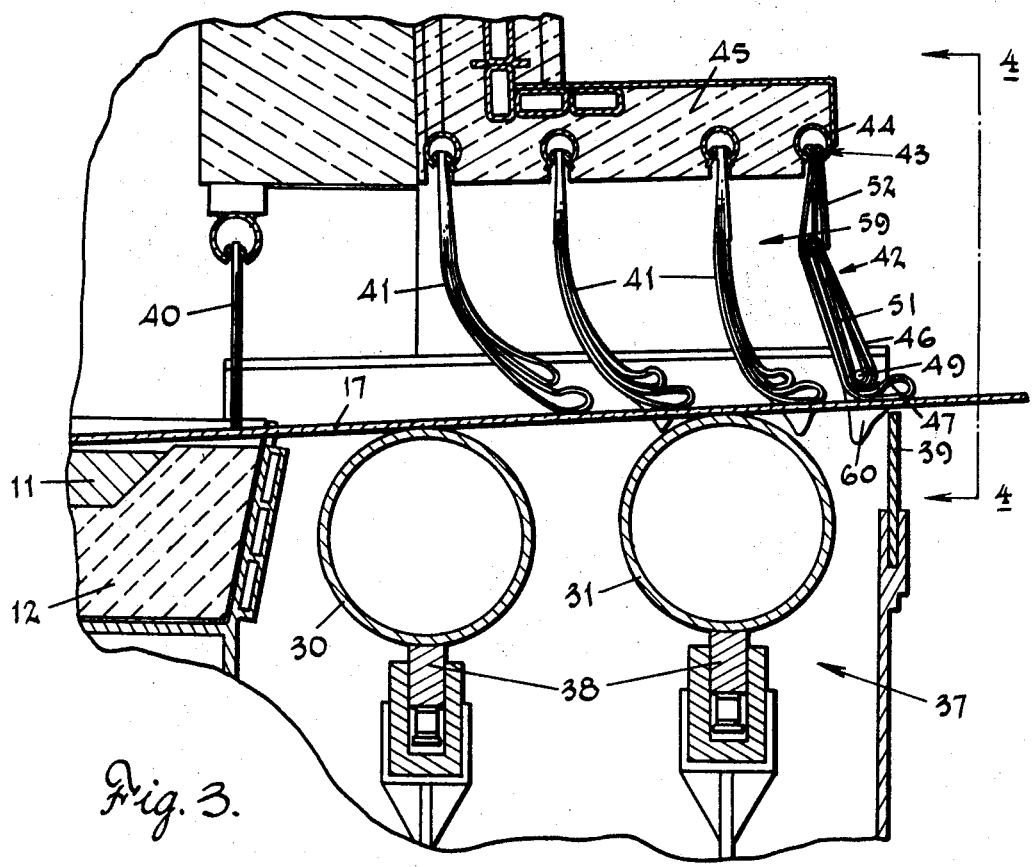
FIG. 3 is an enlarged view of the discharge end of the apparatus of FIG. 1.
Figure 4:
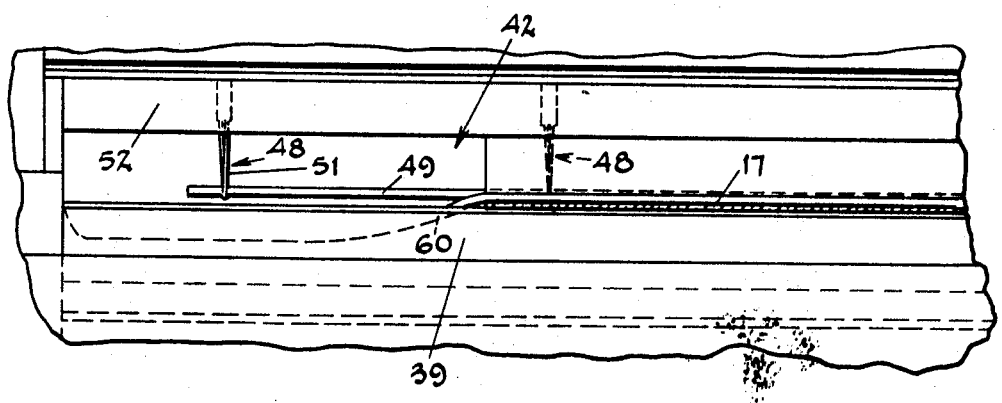
FIG. 4 is a fragmentary, end view taken substantially along the line 4—4 in FIG. 3.

Referring now more particularly to the drawings, there is illustrated in FIGS. 1 and 2 a typical float glass machine generally similar to the one disclosed in U.S. Pat. No. 3,083,551. In this apparatus molten glass 6 is supplied from a forehearth 7 to a spout lip 8 in an amount regulated and controlled by a tweel 9 and a gate 10.

The glass flowing from the spout 8 onto the relatively wide metal bath 11 forms a buoyant molten body indicated at 16 and a buoyant layer of stable thickness 17 develops therefrom.

The metal bath 11, which is contained in a tank 12, and the headspace 21 over the bath are heated by radiant heat directed downwardly from heaters 22 and this headspace 21, which contains the "float atmosphere," is enclosed by a roof structure or plenum chamber 23 which, with extension 24, makes it possible to maintain a sufficient volume of protecting gas over that part of the metal bath 11a that is exposed at each side of the glass in the float chamber. The roof structure 23 is provided at intervals with ducting 25 connected by branches 26 to headers 27 through which the protecting gas is fed into the headspace 21 at a rate to create a plenum therein. The protecting gas is one which will not react chemically with the molten metal in the bath to produce contaminants of the glass (for example, it may be a mixture of nitrogen and hydrogen) and, by providing a plenum ingress to the headspace 21, entrance of atmospheric air is theoretically prevented.

When the ultimate ribbon 28 is to be of substantially the same thickness as the equilibrium or stable thickness of the glass, the temperature of the glass in the buoyant layer or ribbon 17 is controlled so as to progressively cool it from the tweel 29 to the discharge end of the apparatus by which time the ribbon surface should reach a temperature at which it is sufficiently stiffened to allow its transfer to a lehr on mechanical conveying means without detriment to the surfaces.

One type of mechanical conveying means that can be used includes supporting rollers 30 to 33, with superimposed roller 34, mounted beyond the discharge end of the tank 12. Any or all of the rollers 30 to 34 may be driven and cooperate to apply a tractive effort to the ribbon of glass moving towards the outlet end sufficient to advance it along the bath.

When a ribbon of less than equilibrium thickness is desired, this can be obtained by increasing the speed of the rolls 30 to 34 and thereby modifying their tractional effort and attenuating the molten glass body 17 of stable thickness.

As indicated above, it is customary to maintain the side and roof walls 35 and 36 respectively of the plenum chamber 23 as tight as possible and also to substantially close the exit end of the chamber. However, because during operation of the float apparatus a ribbon of glass is being continuously lifted from the end of the bath 11 and conveyed outwardly from the plenum chamber 23 the effective closing and sealing off of the discharge or exit end of the chamber has presented serious problems.

Accordingly, it has been considered desirable to extend the plenum chamber 23 outwardly of the bath tank 12, over the first conveyor rolls 30 and 31; to enclose these rolls in a housing 37; and to provide seals 38 and 39 associated with the rolls and housing to prevent outside air from flowing into the area beneath the ribbon 17 and entering the plenum chamber from there.

More importantly, however, in accordance with the present invention, the exit from the plenum chamber is effectively sealed off from the outside atmosphere by a special drape or combination of drapes.

Thus, as best shown in FIGS. 1 and 3, such a drape combination may include one or more free-hanging drapes 40 of asbestos or other heat-resistant material, arranged inwardly of the exit from the chamber 23 and extending from side to side of the passageway therethrough and from the ceiling of the chamber to a point closely adjacent the ribbon of glass 17. Such drapes act as auxiliary closure means by baffling air movement at the discharge end of the chamber and one or more drag-type drapes 41 may also be employed in this general area.

However, the most effective sealing of the exit end of the plenum chamber, results from hanging a special drape preferably at or quite near the exit. Thus drape, a preferred embodiment of which is shown at 42, can be hung in any suitable manner, for example by means of a bead 43 provided at the uppermost edge of the drape in a shape and size designed to be slid into a slotted, cylindrical supporting receptacle 44 mounted in the roof of the extending portion 45 of the plenum chamber 23.

This preferred form of exit end drape 42 is best shown in FIGS. 3 to 7 of the drawings and comprises a looped sheet 46, adapted to hang above and just out of contact with the glass ribbon 17, and a second, longer looped sheet 47, adapted to drag over the top surface of the glass ribbon as it moves therebeneath. Also associated with the looped sheets 46 and 47 of the drape 42, is a stabilizing device, designated in its entirety by the numeral 48, and which consists of a horizontal rod or bar portion 49 swingably suspended from a plurality of spaced support plates 50 by wires 51.

In assembling the drape 42 the sheet 46 is preferably doubled or looped about he stabilizing device 48 to locate the rod 49 thereof within the loop of the sheet 46. The longer looped sheet 47 is positioned beside the looped sheet 46 and, if desired, a stabilizing or positioning plate 52 may be placed against the outboard side of the looped sheet 46. As best shown in FIG. 6, half-round molding members 53 can then be positioned against the outer surfaces and along the upper margins of the looped sheet 47 on one side and the positioning plate 52 on the other to form the mounting bead 43, and, finally, the several elements then secured together by a plurality of spaced bolts 54 passing therethrough and having their heads and nut ends countersunk beneath the surface of the bead 43.

The looped sheet 46 is of a flexible, refractory, heat-resisting material. For example, asbestos cloth impregnated with colloidal silica has proved to be very satisfactory for the purpose. The sheet 46 may be doubled or looped throughout its width but, preferably, has a looped middle portion of a length at least equal to the width of the narrowest ribbon 17 that is expected to be passing therebeneath and unlooped or single-layer end portions 55 which are adapted to hang down below the looped portion of the sheet at either side of the ribbon 17.

The second and longer looped or doubled sheet 47 must have similar properties to that of the sheet 46 and, in addition, the sheet 47 must be such that as it lies on or, in effect, drags over the surface of the moving ribbon 17 of hot glass it will not scratch or mar this surface and for this purpose a metal-impregnated refractory cloth is preferred and silica cloth impregnated with chromium oxide has given excellent results.

Finally, the positioning and stabilizing elements of the drape 42 include the metal plate 52, arranged outwardly of, and the device 48, which is positioned within, the looped sheet 46. The stabilizing device 48 is made up of a series of rigid, aligned, metal plates 50, having holes 56 at their upper ends to receive the bolts 54 and being provided with openings 57 at their lower ends to receive the end loops 58 of looped wires 51 within which the rod 49 is cradled. The end loops 58 of the wires 51 are of a size to loosely circle the lower end margins of the plates 50 and so cradle or mount the rods 49 for swinging movement and the length of the wires 51 are such that the rod 49 will be centrally located in the bight of the looped sheet 46.

In operation, as the continuous ribbon of glass 17 is lifted from the surface of the molten metal bath 11 and moves outwardly through the extension 45 on the plenum chamber 23, over the rolls 30 to 33, and toward the annealing leer (not shown), it will pass under the exit end drape 42. At this time the looped sheet 46 of the drape 42 will substantially close that part of the passageway 59 through the plenum chamber extension that is directly above the ribbon 17 while the straight, unlooped end portions 55 of the sheet 46 will close the passageway 59 at either end of the glass ribbon. The upper portion of the drape 42 will be positioned, and kept from uninhibited outward swinging movement, by the plate 50 of the stabilizing device 48 and by the positioning plate 52.

At the same time the longer looped sheet 47 will act as a backup closure for the entire width of the passageway 59 and, since its looped end will lie in actual contact with and drag over the upper surface of the ribbon 17, it will completely close the space between the lower end of the looped sheet 46 and the ribbon surface. In addition the portions of the looped sheet 47 that extend beyond the side edges of the ribbon 17 will drape themselves downwardly over the edges of the ribbon, as sown at 60 in FIGS. 3 and 4, to supplement the closing action of the straight end portions 55 of the looped sheet 46.

Because, in this combined action of the looped sheets 46 and 47 the loop end of the sheet 47 drags over the outwardly moving ribbon 17, there is a tendency for the lower portion of the entire drape 42, including the free-hanging sheet 46, to be swung outwardly out of the vertical plane. However, the weight of the rod 49 of the stabilizing device 48 acts to urge the looped sheet 46 toward its normal free-hanging position, to maintain the lower part of the drape 42 in a generally vertical plane and to urge the dragging loop end of the sheet 47 into sealing relation with the surface of the ribbon 17.

To this end, the rod 49 is made of relatively heavy, adequately heat-resistant metal such as iron and, since it is cradled in the wires 51 which are loosely supported from the plates 50, can be swung outwardly by the looped sheet 47 dragging over the ribbon 17 but will, by its weight tend to resist this swinging movement and close any openings between the glass of the ribbon and the looped part of the sheet 47 through which air could leak into the plenum chamber or the float atmosphere escape therefrom.

In fact, so successful has the exit end drape construction of this invention proved that in actual practice, employing the above-described drape, the air pressure within the plenum chamber of a commercially operating float glass machine was increased from the conventional 4 p.s.i. to 12 p.s.i.

As indicated above, the exit end drape 42, i.e., the drape that is actually located at the exit from the plenum chamber, is considered to be the essential one, and must perform the principal sealing job. However, drapes, located as indicated at 41 in FIG. 3, may also be used in this general area and, indeed, closure drapes can be employed to advantage in many areas of the plenum chamber.

Obviously drapes of the structure of the exit end drape 42 would be usable and effective in any location in the chamber. However, somewhat less sophisticated structures may serve as well, depending on the completeness of the seal required in their area of use. For example, drapes such as shown at 41, and which are similar in structure to the drape 42 except that they omit the stabilizing device 48, have worked very well in actual practice as auxiliary drapes at the exit end.

In any event, it is to be understood that the forms of the invention herewith shown and described are to be taken as illustrative embodiments only of the same, and that various changes in the shape, size, number and arrangements of parts may be resorted to without departing from the spirit of the invention as defined in the following claims.

1. In float glass forming apparatus including a tank, a bath of molten metal in said tank and over which a ribbon of glass is floated, and a plenum chamber enclosing a float atmosphere above said bath and having an entrance and an exit end and providing a passageway therebetween, the improvement comprising a drape located within and transversely of said passageway, said drape comprising a first looped sheet of flexible heat-resisting material, a second looped sheet of flexible heat-resisting material longer than said first-mentioned sheet, mounting means including means for suspending said first sheet in said passageway with the loop end thereof adjacent said glass ribbon and means for suspending said second sheet relative to said first sheet whereby said glass ribbon engages and drags the loop end of said second sheet over the surface thereof and beneath the loop end of said first sheet, and stabilizing means positioned within the bight of the loop end of said first sheet of flexible material.

2. Apparatus as defined in claim 1 in which said first looped sheet is provided with straight portions as well as and at either side of the looped portion thereof, and said looped portion is at least as wide as said glass ribbon.

3. In float glass forming apparatus including a tank, a bath of molten metal in said tank and over which a ribbon of glass is floated, and a plenum chamber enclosing a float atmosphere above said bath and having an entrance and an exit end and providing a passageway therebetween, the improvement comprising a drape located within and tranversely of said passageway, said drape comprising a first looped sheet of flexible heat-resisting material, a second looped sheet of flexible heat-resisting material that is longer than said first-mentioned sheet, mounting means including means for suspending said first sheet in said passageway with the looped end thereof adjacent said glass ribbon and means for suspending said second sheet relative to said first sheet so that said glass ribbon will engage and drag he loop end of said second sheet over the surface thereof and beneath the loop end of said first sheet, and stabilizing means including an elongated member positioned within the bight of the loop end of said first sheet, said mounting means including means for swingingly suspending said elongated member in said position.

4. Apparatus as defined in claim 3 in which said mounting means includes a slotted hollow member, and a longitudinally extending bead at the upper end of said drape, said bead being loosely contained in said member and said drape extending downwardly therefrom through the slot in said member.

5. Apparatus as defined in claim 4 in which said second-mentioned sheet is a silica cloth with a metallic impregnant, said hollow member is a cylindrical tube, and said bead on said drape is substantially round in cross section and of lesser diameter than the interior of said tube.

6. Apparatus as defined in claim 4 in which said first-mentioned looped sheet of asbestos cloth impregnated with colloidal silica and provided with straight portions as well as and at either side of the looped portion thereof, said second-mentioned looped sheet is of silica cloth impregnated with chromium oxide, and said rod is of heavy metal.